United States Patent
Weinstein et al.

[11] Patent Number: 6,035,020
[45] Date of Patent: Mar. 7, 2000

[54] MODEM DATA CALL BYPASS OF A TELEPHONE NETWORK VOICE SWITCH

[75] Inventors: Stephen B. Weinstein, Mercerville, N.J.; Keiichi Miyahara, Tokyo, Japan

[73] Assignee: NEC USA, Inc., Princeton, N.J.

[21] Appl. No.: 08/918,820

[22] Filed: Aug. 26, 1997

[51] Int. Cl.$^7$ .................................................. H04M 11/00
[52] U.S. Cl. .................................. 379/93.09; 379/93.05; 379/100.12
[58] Field of Search ............................. 379/93.05, 93.06, 379/93.09, 93.14, 93.18, 93.26, 93.28, 93.31, 93.32, 100.12, 100.15, 100.17, 100.14, 355

[56] References Cited

U.S. PATENT DOCUMENTS

| | | | |
|---|---|---|---|
| 4,197,427 | 4/1980 | Hutvheson et al. | 179/18 |
| 5,590,406 | 12/1996 | Bayley et al. | 379/93.26 |
| 5,668,857 | 9/1997 | McHale | 379/93.14 |
| 5,787,363 | 7/1998 | Scott et al. | 379/93.32 |

OTHER PUBLICATIONS

Carbone et al.; Journal article; Internet thruway: A profitable new route for data traffic, 1–8, Dec. 1996.

*Primary Examiner*—Paul Loomis
*Assistant Examiner*—Melur Ramakrishnaiah
*Attorney, Agent, or Firm*—Sughrue, Mion, Zinn, Macpeak & Seas, PLLC

[57] ABSTRACT

A data bypass system diverts data calls to a central office based modem bank and a data network at the subscriber's discretion. The data call diversion is based on a data service prefix in the user's dialing string. The data bypass device translates a subsequent telephone address of a data service supplier into a data network address. The data bypass system is either analog or digital and has a line card with a switch that selectively connects the subscriber line to the voice switch or to a data switch or router through two respective concentrators. The line card includes a data call prefix detector that controls the switch in response to a data call prefix that precedes a data call telephone number. The analog bypass system diverts a data call to a modem and a data network before the data call reaches a voiceband filter and an A/D converter of the line card, while the digital bypass system diverts the data call through a wideband filter and an A/D conversion before applying the data call to a modem accepting a digitized line signal. The digital bypass system utilizes a line card with two filter and A/D converter modules, one for voice calls and another for data calls. Instead of being in each line card, all the line cards share a telephone number and data service prefix detector located following the voice call concentrator.

32 Claims, 4 Drawing Sheets

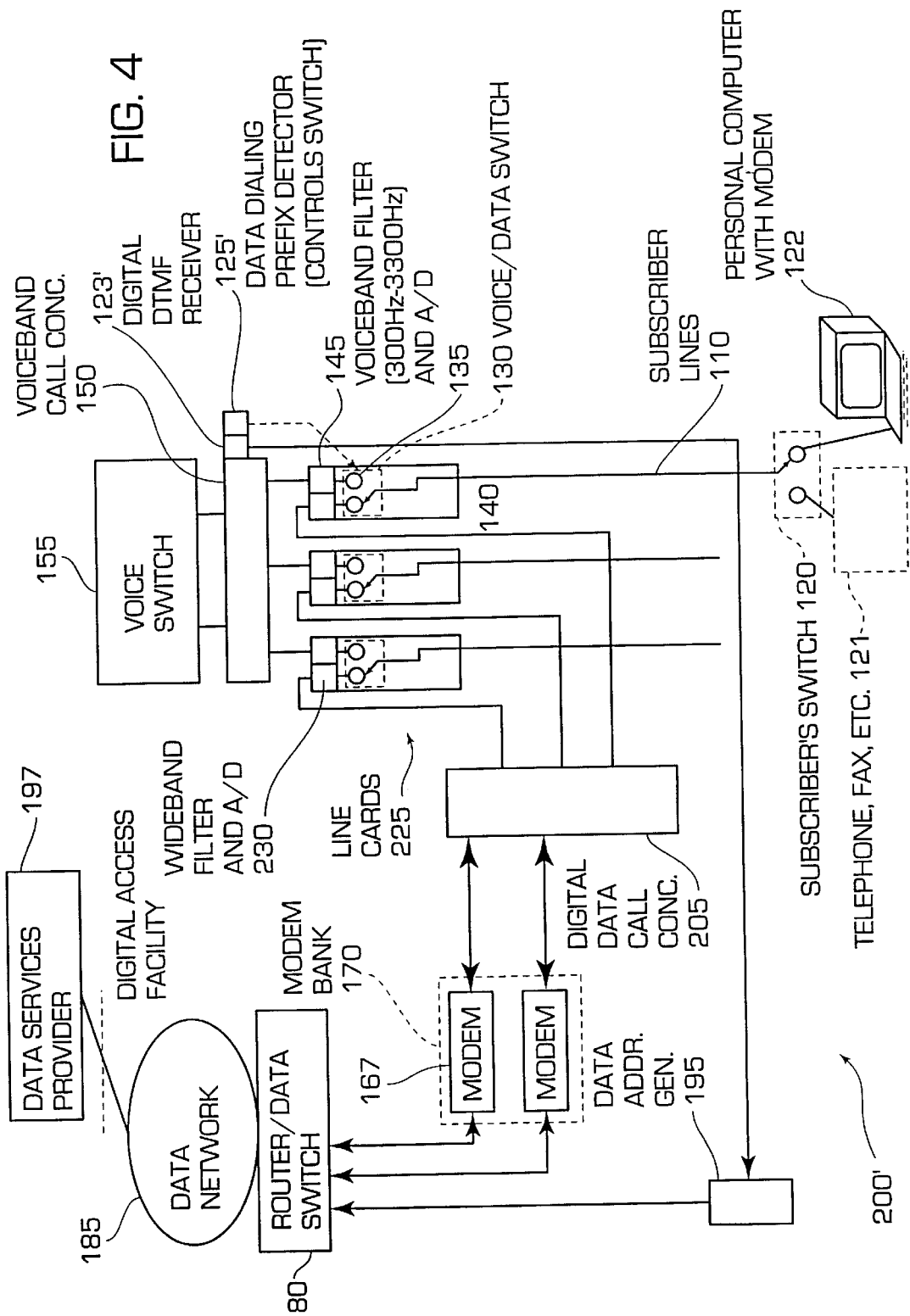

MODEM DATA CALL BYPASS OF A TELEPHONE NETWORK VOICE SWITCH

BACKGROUND OF THE INVENTION

1. Field of the Invention

The present invention is directed to a data bypass system for a voice telephone network, and more particularly, to a modem data call bypass of the telephone network voice switch.

2. Discussion of the Prior Art

The majority of existing telephone access networks are analog networks designed primarily for voice traffic. With the proliferation of computers and on-line service providers, the analog telephone networks are being used for communication between digital computers. The popularity of the Internet has greatly increased communication among digital computers through existing analog telephone networks. To allow communication among digital computers through existing analog telephone networks, modems are used that change digital data signals into analog line signals.

Telephone companies are concerned about the loading of telephone network switches which are not engineered for the long holding times of data sessions between personal computers (PCs) and data service (e.g., Internet access) providers. To alleviate this loading problem, new digital access facilities, such as Integrated Service Digital Network (ISDN) and Asymmetric Digital Subscriber Line (ADSL), are being deployed. However, in addition to new equipment at the telephone central offices, these new access facilities require major and expensive changes in facilities at subscriber locations.

For several reasons that include cost, convenience and familiarity, subscribers or end users often prefer to continue using existing telephone lines and modems with their PCs, instead of upgrading to digital networks, such as the ISDN or ADSL network. Thus, data traffic among PCs and networks on existing telephone lines continue to grow and overload telephone network switches.

One solution to the growing data traffic and switch overload problem is to limit the length of time a subscriber can hold a telephone circuit. However, such holding time restrictions are unpopular with subscribers. Accordingly, there is a need to alleviate congestion and traffic overload of existing telephone network switches that is cost effective and does not require expensive new equipment or changes in facilities at subscriber locations.

SUMMARY OF THE INVENTION

The object of the present invention is to provide a full-duplex modem data call bypass system of a telephone network voice switch that eliminates the problems of conventional telephone network voice switches.

Another object of the present invention is to provide a data bypass system that offloads data traffic from telephone voice switches and facilitates evolution toward Integrated Service Digital Network (ISDN) or Asymmetric Digital Subscriber Line (ADSL) systems without requiring immediate installation of new equipment at subscriber locations.

Yet another object of the present invention is to provide a data bypass system at a telephone central office that reduces loading of the telephone network voice switches without requiring additional equipment at subscriber locations.

A further object of the present invention is to provide a data bypass system that allows telephone central office subscriber line termination equipment to provide long connection duration Internet access to subscribers through existing subscriber lines, without tying up telephone voice switching resources.

A still further object of the present invention is to provide a data bypass system located, for example, at a telephone central office that is cost effective and alleviates switching problems of voice traffic that are caused by increased data traffic.

A further object of the present invention is to allow a subscriber to use a subscriber line for normal voice telephony, for data transmission through the telephone network, or for data transmission through the data bypass network, with no control mechanism other than a special dialing sequence. If desired, a permanent connection between the subscriber and the data bypass network is provided to eliminate the need for dialing the special dialing sequence and to give the subscriber "always on" data network access service.

These and other objects of the present invention are achieved by a data bypass system that diverts data calls to a central office based modem bank connected to a data network. Unless the connection between the subscriber and the data bypass network is permanent, the data call diversion is based on the special dialing sequence, such as a data service prefix in the user's dialing string, which is represented as a dual-tone multiple frequency (DTMF) line signal, for example. The data bypass device is capable of translating a subsequent telephone address of a data service supplier into a data network address of that particular supplier.

The data bypass system is either an analog or a digital bypass system for modem data call bypass of a telephone network voice switch. The bypass system comprises a special line card connected to a subscriber line. The line card selectively connects the subscriber line, through a signal selector or switch for example, to the voice switch or to a data switch or router. The data switch or router is the access point to a data network.

The data bypass system also includes a data prefix detector that controls the selective connection of the subscriber line in response to a data prefix that precedes a data call telephone number dialed on the subscriber line, for example, to establish communication between computers.

In one embodiment, a receiver for user-network signaling, e.g., a DTMF receiver, and the data prefix detector are included in the line card. In another embodiment, the DTMF receiver and data prefix detector are external to the line card and are shared by other line cards.

A voiceband call concentrator is connected between the line card and the voice switch. The voiceband call concentrator is connected to the subscriber line in the absence of the data prefix. A data call concentrator is connected between the line card and the data switch. This data call concentrator is connected to the subscriber line in the presence of the data prefix as detected by the data prefix detector.

A two wire-four wire converter, a voice-band filter, and an analog to digital converter on the line card are interposed between the voiceband position of the signal selector on the line card and a digital output port, for example. A digital line connects the digital output port of the line card to the voiceband call concentrator. In an analog embodiment of the bypass system, an analog full-duplex signal line connects the data call position of the signal selector on the line card to the data call concentrator. A digital line connects the line card to the data call concentrator in a digital embodiment of the bypass system.

A modem bank having many modems, or a programmable device with the equivalent functionality of many modems, is connected between the data call concentrator and the data switch or router. The data call concentrator selects an available modem for the transmission to the data switch of the user data that follow the data call telephone number. Data are routed or switched to a distant data services host, such as an Internet service provider, having a permanent digital connection to the data network, for example.

In one analog embodiment of the bypass system, for example, each line that connects the data call concentrator to the modems is also connected to a signaling receiver, e.g., an analog DTMF receiver, followed by a data address generator. The analog DTMF receiver converts DTMF tones of the data call telephone number to numbers, and the data address generator translates these converted numbers, which represent the telephone number of a data service supplier, for example, into a data network address, such as an Internet Protocol (IP) address. In this example, the IP address is applied to IP packets created in the router from the digital data stream emerging from the modem and passed to the router.

In one embodiment of the digital bypass system, the line card with its voice/data switch or selector, which is initially in the default "voice" position, provides the voiceband call concentrator with a digital line signal at the normal voiceband digital sampling rate, including the DTMF-coded data prefix and the data call telephone number. If the data prefix detector following the voiceband call concentrator detects a data bypass call, an alerting signal is provided to the line card which moves the voice/data switch to the data bypass position. The wideband data line signal is then passed through a two wire-four wire converter, a wideband filter, and an analog to digital (A/D) converter (including a higher-rate sampler) to a data concentrator, a digital modem bank, and a data router or switch. Illustratively, the subscriber line is connected to a computer at a subscriber site, and user data are routed or switched to a distant host having permanent digital access to the data network.

In the digital bypass system, lines that connect both ordinary voice-oriented line cards and the special line cards to the concentrators, as well as lines that connect the data call concentrator to the modem bank, are digital lines. The subscriber lines are, as in the analog bypass system, analog full-duplex two-wire signal lines, for example.

The line card of the digital bypass system further comprises two filtering and A/D conversion units. The first unit includes a voice-band filter and an analog to digital converter to filter and digitize signals directed to the voice switch. The analog to digital converter is connected to the voice call concentrator located between the line card and the voice switch. The second filtering and A/D conversion unit includes the wideband filter and another A/D converter which has a higher-rate than the A/D converter of the first filtering and A/D conversion unit. The second unit is connected to the data switch or router through the data call concentrator.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references numbers throughout the drawings; and in which:

FIG. 4 shows a digital bypass system according to a fourth embodiment of the present invention.

DETAILED DESCRIPTION OF THE INVENTION

Figure 1:
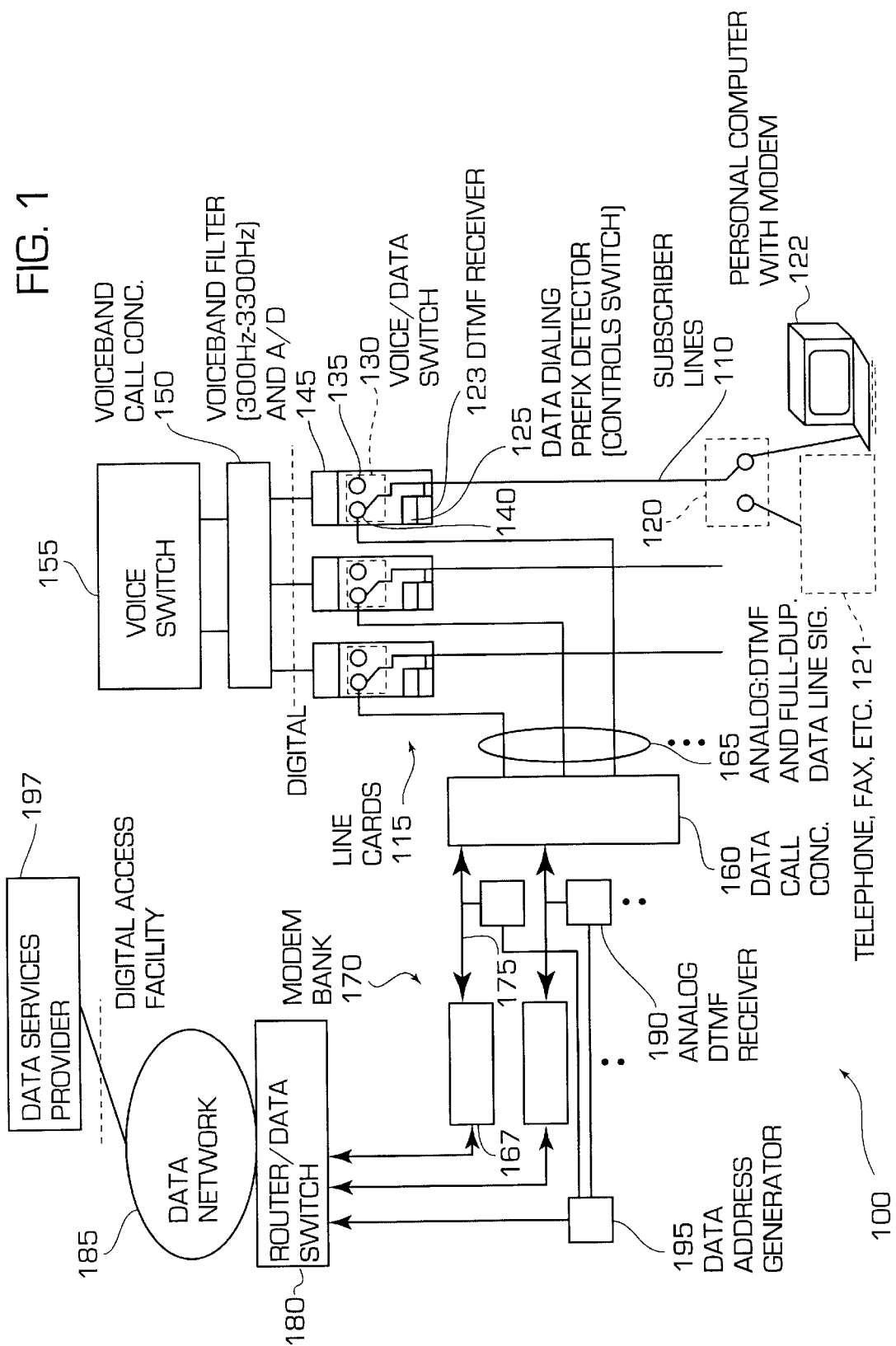
FIG. 1 shows an analog bypass system according to a first embodiment of the present invention.

FIG. 1 shows a modem data call bypass of a telephone network voice switch using an analog bypass system 100. The analog bypass system 100 includes subscriber lines 110. Each subscriber line 110 is connected between a subscriber and a special line card 115. At the subscriber location, a subscriber switch 120 connects the subscriber line 110 to a personal computer (PC) 122 with a modem or to other devices, such as a telephone or a facsimile machine 121, commonly referred to as a fax machine. Thus, the subscriber line 110 can be used for either normal voice (or fax) service or for a modem call, at the subscriber's discretion. Typically, the switch 120 is built into PCs. As will be described, a modem call from the PC 122, for example, can pass either through the conventional telephone network or through a data bypass network, at the subscriber's discretion.

At the telephone network central office location, for example, the subscriber line 110 is connected to the special line card 115. Each line card 115 contains a user-network signaling receiver 123, such as a dialing tone receiver, a data call prefix recognizer 125, and a call diversion switch 130. All other elements of the line card 115, including two wire-four wire conversion (means omitted from FIG. 1 for simplicity), remain unchanged from conventional line cards. Thus, as will become more apparent from the following description, modifying existing telephone networks in accordance with the present invention is cost effective and does not require updating subscriber lines or adding any new subscriber equipment. To further reduce cost of modifying existing telephone networks, only subscribers actively engaged in data communications need be provisioned with these new or special line cards 115.

The dialing tone receiver 123 of the line card 115, in the analog embodiment of the bypass system 100 shown in FIG. 1, is an analog device. Illustratively, the analog dialing tone receiver 123 is a Dual Tone Multiple Frequency (DTMF) receiver or detector, and the data call prefix recognizer or detector 125 connected to the DTMF receiver 123 is an alphanumeric character sequence detector. Instead of the dialing tone receiver 123 that detects a dialing tone, another type of user-network signaling receiver for identifying a data call may be used, such as a receiver that detects a waveform designated as the data call identification prefix.

The DTMF detector 123 receives and detects tones of a telephone number dialed on the subscriber line and outputs the digital dialing sequence. The data call prefix detector 125 acts on this digital sequence to identify a prefix that precedes a data call telephone number dialed on the subscriber line, e.g., for communication among computers. The prefix is part of a normal dialing sequence of numbers that precedes the telephone number of a data service (e.g., Internet access) provider. Thus, using the prefix does not limit access to a particular set of data service providers, as performed in conventional systems. Rather, any destination may be accessed, which destination is a function of the telephone number after the prefix.

The DTMF receiver 123 and prefix recognizer 125 detect a data dialing prefix in the user's dialing string. The prefix could be any convenient prefix, such as a double pound (##). The prefix recognizer 125 controls the call diversion switch 130, also referred to as a voice/data switch 130. The voice/data switch 130 is a single-pole, double-throw (SPDT) switch, for example, having a single input terminal and two output terminals 135, 140. However, the voice/data switch 130 may be realized by other electro-mechanical or electronic forms.

Although a data call prefix indicator comprising a dialed DTMF sequence is the preferred embodiment, other embodiments are possible, such as, where subscriber communications software generates such alternative signaling indicators and the line card detects these indicators. Once the voice/data switch 130 is switched to the data call bypass position 140, confirmation by a modem bank for connection with the user's modem is conveyed by normal modem-to-modem connection protocols. Permanent connection of a subscriber line to a modem dedicated to that line is also possible, in which case no data prefix or telephone number signaling is used. Instead of a modem bank, a programmable device with the equivalent functionality of many modems may be used.

The input of the voice/data switch 130 is connected to the subscriber line 110. One of the output terminals 135 of the voice/data switch 130 is connected to a voice-band filter 145 which includes an analog-to-digital (A/D) converter. The pass band of the voice-band filter 145 is 300 Hz to 3300 Hz, for example. The analog voice or fax signal routed through the voice/data switch 130 is filtered by the voice-band filter 145. Next, the filtered analog signal is converted to a digital signal by the (A/D) converter which is connected to the output of the voice-band filter 145.

The digital output of the A/D converter is connected to a concentrator 150, referred to as a voiceband call concentrator, through a digital line that carries digital signals. The voiceband call concentrator 150 also receives digitally converted voice/fax signals from other line cards 115. The output of the concentrator 150 is connected to a voice switch 155 as in conventional telephone switching equipment. The concentrator 150 has many inputs connected to the line cards 115. The number of outputs of the concentrator 150 is less than the number of its inputs. The concentrator 150 connects its active inputs to the voice switch 155 as is typically performed in conventional telephone voice switching.

The arrangement of the voice-band filter 145 and its A/D converter may be reversed. That is, instead of the voice-band filter 145 being connected to the line card switch output 135, where the voice-band filter 145 is analog, the A/D converter is first connected to the line card switch output 135. Next, the digital output of the A/D converter is connected to the input of the voice-band filter 145, whose output is connected to the concentrator 150. In this case, the voice-band filter 145 is a digital filter. Preferably, the voice-band filter 145 and the A/D converter are part of the line card 115. However, the voice-band filter 145 and the A/D converter may be external to the line card 115, and may be incorporated into the voiceband call concentrator 150.

The other output 140 of the voice/data switch 130 is connected to another concentrator 160, through a line 165. The second concentrator 160, also referred to as a data call concentrator, is in addition to the voiceband call concentrator 150. The second, or data call, concentrator 160 is also connected to similar outputs of other line cards through lines similar to the line 165 from the second output 140 of the voice/data switch 130. Illustratively, the lines 165 between the lines cards 115 and the second concentrator 160 are analog two-wire full-duplex data lines that transport analog signals in both directions-from the line cards 115 to the data call concentrator 160, and from the data call concentrator 160 to the line cards 115. The datacall concentrator 160 is also referred to as a director, because it selects and directs its input signals to available modems 167 from a modem bank 170 connected to the outputs of the second concentrator 160.

The modem bank 170 has many modems 167, where each modem 167 connects one output 175 of the data call concentrator 160 to a router or data switch 180. Each line 175 that connects the second concentrator 160 to a modem 167 is also connected to an analog DTMF receiver 190. The analog DTMF receivers 190 are connected to a shared data address generator 195, which is in turn connected to the data switch or router 180 of a data network 185. Thus, each output 175 of the second concentrator 160 is connected to the data switch or router 180 through a modem 167 and through the series connection of the analog DTMF receiver 190 and the data address generator 195.

The analog DTMF receiver 190 and data address generator 195 translate the telephone number of a data service supplier, or another data destination, into a data network address. In particular, the analog DTMF receiver 190 converts tones of dialed digits following a data dialing prefix into a telephone number, which is converted by the data address generator 195 into an appropriate equivalent, such as an Internet Protocol (IP) address. The data call is routed by the line card 115 to the data call concentrator 160, thus bypassing the voice switch 155. The data address generator 195 converts the telephone number to a data network address by lookup in a table which has been generated from directory services, as is well known in the art. As described later, this address conversion will sometimes be superfluous but is advisable in all cases.

The DTMF receiver 190 that converts the data call tones into numbers may be combined with the DTMF receiver 123 and data call prefix detector 125 located in the line card 115. In this case, the DTMF receiver 123 recovers the telephone number itself and passes it to the data address generator 195. This is in addition to the DTMF receiver 123 and data call prefix detector 125 detecting the DTMF tones corresponding to the data prefix that precede the dialed telephone number of a data call.

Illustratively, each modem 167 of the modem bank 170 is a full duplex modem that converts between modulated line signals and baseband digital signals. The modulated line signals are on the call director side of the modem 167, i.e., the side of the data call concentrator 160, and the baseband digital signals are on the side of the modem facing the router or data switch 180.

To achieve a predetermined blocking rate, the number of modems in the modem pool 170 may be less than the number of line cards 115 served by the data call director or concentrator 160. Alternatively, permanent data connection may be provided between the modems 167 and the data-capable line cards 115. In this case, the number of modems 167 is equal to the number of line cards 115 capable of switching data calls toward the modem pool 170. If desired, a permanent connection between the subscriber and the data network 185 is provided to eliminate the need for dialing the special dialing sequence. This also eliminates the need for the voice/data switch 130 and the prefix detector 125 that controls the switch 130.

The baseband digital signals received by the router 180 are communicated through the data network 185, which is running Transport Control Protocol/Internet Protocol (TCP/IP), for example, with a data service provider 197 associated with the dialed telephone number. If a subscriber is using an IP protocol, such as Serial Line Internet Protocol (SLIP) or Point-to-Point Protocol (PPP), then the traffic can be forwarded through the router 180 to the data service provider 197. The IP address generated in the data address generator 195 is superfluous. If this is not the case, IP packets and preferably TCP protocol data units as well, are formed in the router 180 to carry traffic to the data service provider 197. The IP address generated in data address generator 195 is applied to the destination address field of each IP packet.

If the data network 185 and the user are using different protocols, then the data switch or router 180 converts between data communication formats and protocols used in the data network, and those used in the user data stream are passed from the modem bank 170 to the data switch or router 180. Thus, for example, the data switch or router 180, in addition to handling IP traffic from the subscriber, also performs TCP/IP packetization if the subscriber is not using IP, including the insertion of a data network address in each IP packet sent out on the data network. The data services provider 197 is presumed to already have a data network connection, so that no digital to analog conversion is required between the data network 185 and the data services provider 197.

In use, if a modem call is to be made, the caller dials a prefix, such as double pounds (##), prior to dialing the telephone number. This may conveniently be programmed in communication software, with no alteration of existing software or hardware components. Depending on the presence or absence of the prefix, the voice/data switch 130 of the line card 115 directs the call to the voice switch 155 or to the data network 185. For example, if the data dialing prefix detector 125 detects the prefix in the dialed number, then the prefix detector 125 switches the voice/data switch or selector 130 of the line card 115 to direct the data call to the data network 185. Otherwise, the call is directed to the voice switch 155. Illustratively, the default state of the line card switch directs calls to the voice switch 155. However, a default state that directs calls to the data network 185 may also be used, although it is inadvisable if the line is to be used at any time for ordinary telephone service. Upon completion of the session, the subscriber's modem hangs up, interrupting subscriber line current. This is detected, as in current practice, by loop detection circuitry not shown in FIG. 1. An alerting signal from this loop detection circuitry can be used to reset the switch 130 to its default (normally contact 135) position.

In the case where the default state of the line card's voice/data switch 130 directs calls to the voice switch 155, upon recognizing the data prefix, the prefix detector 125 switches the voice/data switch 130 so that the line card 115 routes the call to the data call concentrator or director 160. In turn, the call director 160 selects from an available modem 167 in the modem pool or bank 170, for connection to the data network 185.

Connection between the data call concentrator 160 and the data network 185 is achieved as follows. First, the series connection of the analog DTMF receiver 190 and data address generator 195 translate the data call telephone number into a data network address. Next, the modem 167 converts the analog data signal to a digital form and provides digital data to the router or data switch 180. The router or data switch 180, which uses transport and network level protocols such as TCP/IP, packetizes the digital data at these levels if the data are not already packetized, with each IP packet having its own particular address. The IP packet address is obtained from the data network address received from the data address generator 195. Based on the IP packet addresses, the router 180 routes the digital data from the modem 167 to the proper addresses of the data network 185. This establishes two way communication between the data network 185 and the PC 122 at the subscriber location.

In the analog bypass system shown in FIG. 1, data line signals on the subscriber lines 110 are in analog format before concentration and submission to a modem 167 in the modem bank 170. In this analog embodiment, the data signal does not pass through the voice-band filter 145 in the telephone line card 115. Thus, the data line signal is not limited to the 300–3300 Hz voice-band spectrum. This allows using a bandwidth larger than the voice-band, up to several hundred kilohertz for the typical subscriber line, for example. Such a large bandwith supports a rapid evolution to higher data rates, that could approach that of ISDN and ADSL dedicated digital lines, but without the need for the expensive equipment and installation of the ISDN or ADSL subscriber terminations. Larger bandwidths and higher data rates can be used on existing twisted pair subscriber lines since new generations of modems for PCs are better able to use the available bandwidth of a twisted pair subscriber line, which is much larger than the bandwidth of a telephone channel.

Figure 2:
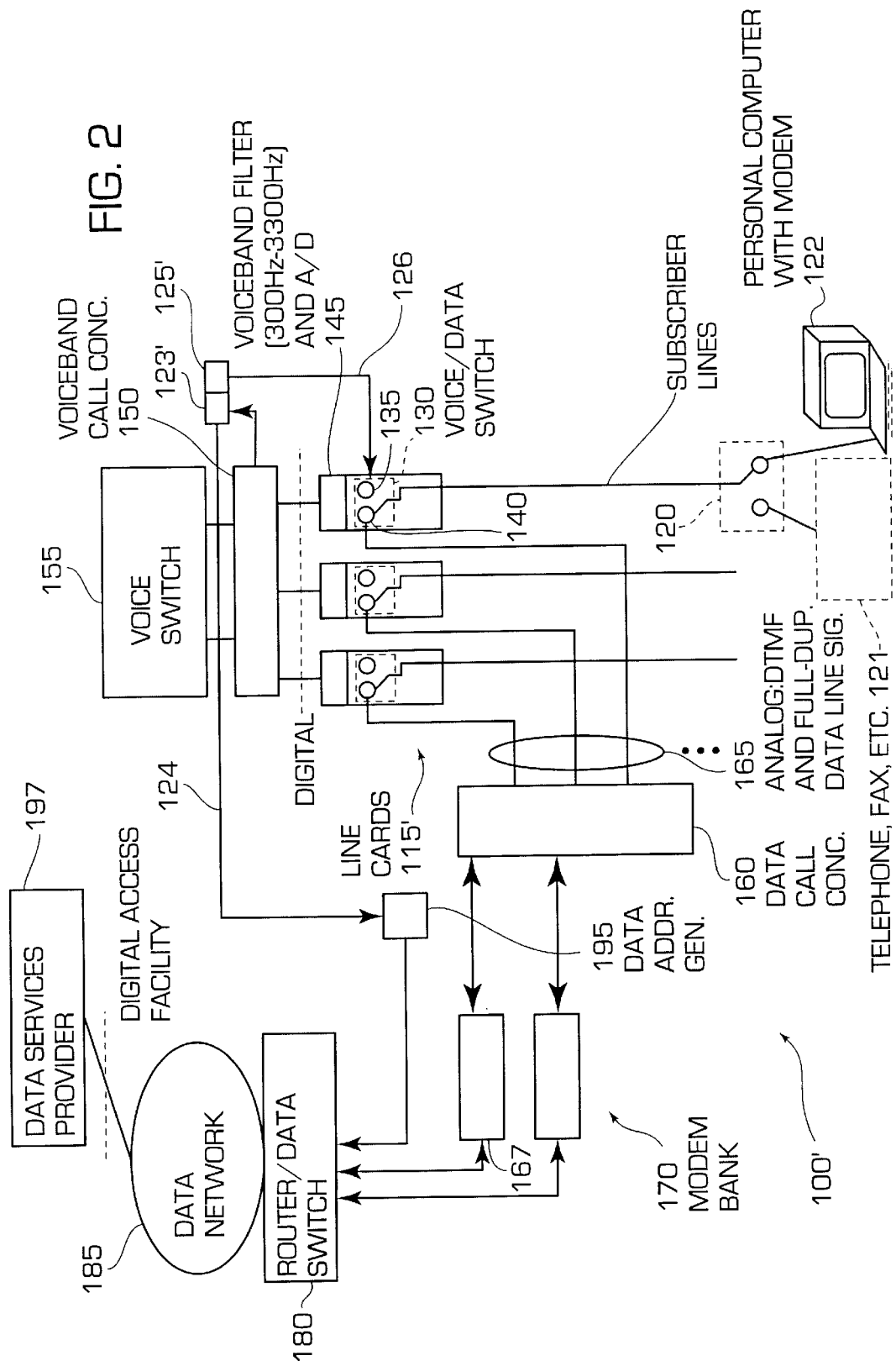
FIG. 2 shows an analog bypass system according to a second embodiment of the present invention.

FIG. 2 shows a modified analog bypass system 100' which is similar to the analog bypass system 100 of FIG. 1. In the modified analog bypass system 100', a digital DTMF receiver 123' and a data call prefix detector 125' are implemented digitally following the voice call concentrator 150. This exploits an existing architecture and eliminates the need to have an analog DTMF receiver 123 and a data call prefix detector 125 for each of the line cards 115 of the analog bypass system 100 shown in FIG. 2. Instead, all the line cards 115' share the digital DTMF receiver 123' and the data call prefix detector 125'. Furthermore, in the modified analog bypass system 100', the analog DTMF receivers 190 shown in FIG. 1 are eliminated, since their function is performed by the shared digital DTMF receiver 123'.

A switch control line 126 connects the data call prefix detector 125' to the voice/data switch 130 for control thereof. A numerical telephone address output line 124 conveys the telephone number from the digital DTMF receiver 123' to the data address generator 195.

The operation of the modified analog bypass system 100' is similar to that already described in connection with the analog bypass system 100 of FIG. 1. The voice/data switch 130 of the modified analog bypass system 100' must be initially in the default voiceband call position 135, so that the data call prefix and telephone number pass through the voiceband filter and A/D converter 145 to the digital DTMF receiver 123' and to the prefix detector 125'.

If a data bypass call prefix is detected, a signal passed from prefix detector 125' to voice/data switch 130 causes the switch to move to position 140, corresponding to data bypass. All subsequent modulated data flow directly to the data call concentrator 160, as described in connection with FIG. 1, bypassing the voiceband switch 155. The small price of loading at most a few seconds of data call dialing onto the voiceband call concentrator 150 is paid for the benefit of using the shared resources of the digital DTMF receiver 123' and the prefix detector 125'. The destination telephone number itself is passed from the digital DTMF receiver 123' to the data address generator 195 via the numerical telephone address output line 124.

Figure 3:
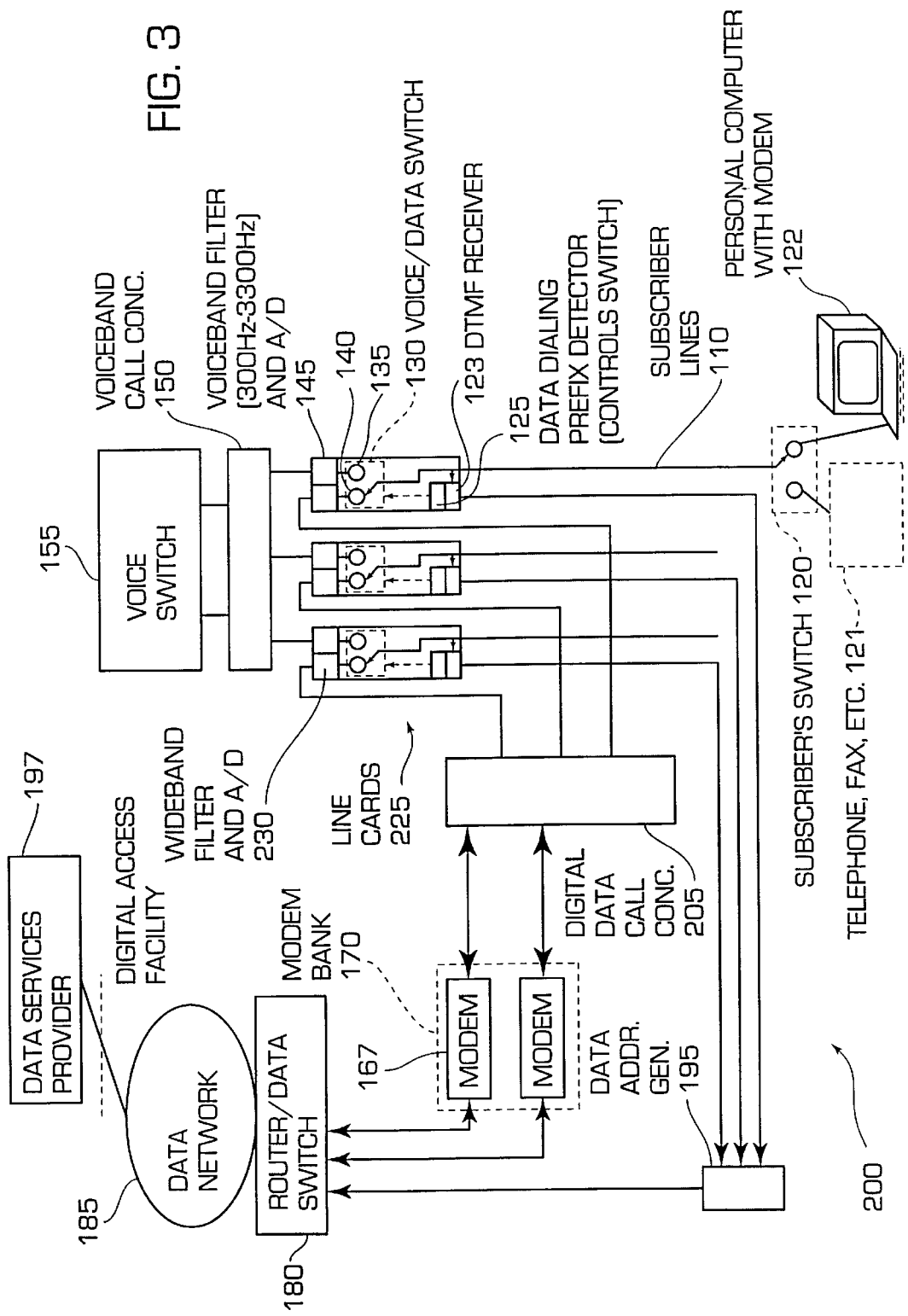
FIG. 3 shows a digital bypass system according to a third embodiment of the present invention.

FIG. 3 shows another embodiment of the present invention, which is a digital bypass system 200. In the digital bypass system 200, data calls from a computer, e.g., PC 122, are diverted to a wideband filter and A/D converter 230, which provide a digitized data line signal to a digital data call concentrator 205. This is in contrast to the embodiment shown in FIG. 1, which is an analog bypass system, where data calls from the PC 122 are diverted to the analog data call concentrator 160 before filtering and A/D conversion take place in the modem 167.

The digital bypass system 200 has a DTMF receiver 123 and a data prefix detector 125 on each line card 225, similar to the analog bypass system 100 of FIG. 1. The digital bypass system 200 uses a digital data call concentrator 205 rather than the analog data call concentrator 160 of the analog bypass system 100 of FIG. 1.

FIG. 4 shows a modified digital bypass system 200', which is a preferred embodiment compared with the digital bypass system 200 of FIG. 3. In the modified digital bypass system 200', just as in the modified analog bypass system 100' of FIG. 2, a digital DTMF receiver 123' and a data prefix detector 125' are shared by all the line cards 225.

The operation of the normal and modified digital bypass system 200, 200' is very similar to that of the normal and modified analog bypass system 100, 100' shown in FIGS. 1, 2, respectively. One exception is that the modulated data stream switched to the switch terminal 140 of the voice/data switch 130 is applied to a wideband filter and A/D converter 230 instead of being routed to the analog data call concentrator 160 shown in FIGS. 1 and 2. The digital output signal from wideband filter and A/D converter 230 is routed to the digital data call concentrator 205.

In the normal and modified digital bypass system 200, 200' of FIGS. 3–4, the subscriber line 110 carries modulated data traffic between the PC 122 and a line card 225. The data prefix is part of the normal dialing sequence, as previously described in connection with FIGS. 1–2. Each line card 225 has both a voiceband filter and A/D converter 145, and a wideband filter and A/D converter 230. Alternatively, similar to that described in connection with FIGS. 1–2, the voiceband filter and A/D converter 145, and the wideband filter and A/D converter 230 are external to the line cards 225. Illustratively, the wideband filter has a bandwidth of up to several hundred kHz, whereas the voiceband filter bandwidth is approximately 3 KHz, from 300 Hz to 3300 Hz.

The line cards 225 are connected to the data call concentrator/director 205. The data call concentrator 205 of the digital bypass system 200 is connected to the data network 185 through the modem bank 170 and the router or data switch 180. In addition, the numerical telephone numbers are produced either by the analog DTMF receiver 123, of the normal digital bypass system 200 shown in FIG. 3, of each line card 225, or by the digital DTMF receiver 123', of the modified digital bypass system 200' shown in FIG. 4. The numerical phone numbers are shared among all line cards 225, and are passed to the data address generator 195. As described in connection with FIGS. 1–2, the data address generator 195 is connected to the data switch or router 180. The comments made earlier concerning advantages and disadvantages of sharing the DTMF receiver and data call prefix recognizor or detector by all the line cards, as opposed to each line card having its own DTMF receiver and data call prefix detector, in the analog embodiments of FIGS. 1–2, are equally applicable for the digital embodiments of FIGS. 3–4.

The lines that connect the concentrator 205 to the modem bank 170 are digital lines that carry digitized data line signals. Signals between the concentrator 205 and the line cards 225 are also digital signals. However, the subscriber lines 110 are conventional subscriber analog full-duplex lines carrying analog signals.

The line card 225 provides the voice channel concentrator 150 with a digitized line signal representing the data call prefix and the data call telephone number, for communication among computers. When voice/data switch 130 is triggered by the output of the prefix detector 125 to switch to position 140, the concentrator 205 routes and connects the digitized information line signal output of the line card 225 to the modem bank 170 and then to the data switch or router 180. Upon completion of a data communication session, the switch 130 returns to the default voiceband position 135 as described for the system of FIG. 1.

In the absence of the data prefix, i.e., for calls over subscriber lines 110 connected to devices other than computers, such as telephones and faxes, or for computer data calls that the subscriber wishes to send through the telephone network, the voiceband call concentrator 150 connects the line card 225 to the voice switch 155 as in conventional telephone systems.

In this case of no data call prefix, a voice-band filter and A/D converter 145 digitize and filter the signal (e.g., a voice signal) on the subscriber line 110 in the same manner described in connection with FIG. 1, and pass the digitized output to the voice call concentrator 150.

When there is a data call prefix, the wideband filter and A/D converter 230 digitize and filter the data signal on subscriber line 110 and pass the digitized output to the data call concentrator 205. It is noteworthy that the filter 230 is wideband, thus allowing use of higher modem speeds.

For any of the embodiments shown in FIGS. 1–4, conventional voice-oriented line cards may be used side-by-side with the new line cards 115, 115', 225, 225' that accomodate data bypass. Only subscribers actively using data services need be provisioned with the new line cards.

The inventive data bypass system off-loads data traffic from telephone voice switches upon detection of a dialing prefix that precedes the telephone number of a data network. This reduces gridlock of telephone networks resulting from surging data traffic, e.g., due to surging Internet use.

Data traffic between PCs and data networks not only bypasses the telephone voice switch, but also bypasses the voice-band filter normally used for voice signals. This reduces congestion of the telephone voice switch, reduces data call blocking with a properly engineered data bypass system, and supports faster data rates due to the increased filter bandwidth. Data bypass is achieved in a cost effective manner that facilitates evolution toward ISDN or ADSL capabilities without requiring immediate installation of new equipment at subscriber locations.

Existing telephone network equipment is used to provide either permanently connected Internet access, or switched connection Internet access in response to a prefix on the normal dialed telephone number, to subscribers through existing subscriber lines. Existing network terminating equipment and subscriber data equipment are used, with changes only within the telephone network. Such changes minimize cost and allow use of higher modem speeds by relaxing the bandwidth constraints of conventional line cards resulting from bypassing of voice-band filters. The data bypass device which is located, for example, at the telephone central office, is cost effective and alleviates switching problems of voice traffic caused by increased data traffic.

Existing telephone lines are used for both data and voice traffic. The existing telephone lines may be switched between data network and voice network access, or dedicated to either network. Thus, data transmission is achieved through a data network with no subscriber equipment changes and with minimal changes in equipment at the telephone central office, in order to detect data transmission and allow bypass thereof away from the telephone voice switch and into a dedicated data network. Such a data detection and bypass is controlled entirely by conventional DTMF signaling, through a prefix in normal dialing sequence.

While the invention has been particularly shown and described with respect to illustrative and preferred embodiments thereof, it will be understood by those skilled in the art that the foregoing and other changes in form and details may be made therein without departing from the spirit and scope of the invention, which should be limited only by the scope of the appended claims.

Having thus described our invention, what we claim as new, and desire to secure by Letters Patent is:

1. A bypass system for modem data call bypass of a telephone network voice switch comprising:
   a line card connected to a subscriber line for selectively connecting said subscriber line to one of said voice switch and a router;
   a data call prefix detector for controlling the selective connection of the subscriber line in response to a data call prefix that precedes a data call telephone number dialed on the subscriber line;
   a voiceband call concentrator connected between said line card and said voice switch, said voiceband call concentrator being connected to the subscriber line in the absence of said data call prefix; and
   a data call concentrator connected between said line card and said router, said data call concentrator being connected to the subscriber line in the presence of said data call prefix.

2. A bypass system as claimed in claim 1, wherein the connection between said data call concentrator and said line card bypasses a filter of said line card.

3. A bypass system as claimed in claim 1, further comprising a voice-band filter and an analog to digital converter that are connected between said line card and said voiceband call concentrator.

4. A bypass system as claimed in claim 1, wherein said line card further comprises a voice-band filter and an analog to digital converter to filter and digitize signals directed to said voiceband call concentrator.

5. A bypass system as claimed in claim 1, wherein a line that connects said line card to said voiceband call concentrator is a digital line that carries digital signals.

6. A bypass system as claimed in claim 1, wherein a line that connects said line card to said data call concentrator is an analog full-duplex signal line.

7. A bypass system as claimed in claim 1, further comprising a user-network signaling receiver that detects waveforms designated as the data call identification prefix.

8. A bypass system as claimed in claim 1, wherein said line card includes a user-network signaling receiver and said data call prefix detector, said receiver for detecting tones of a data call identification prefix and a telephone number dialed on the subscriber line, and said data call prefix detector for detecting the pattern of said data call prefix.

9. A bypass system as claimed in claim 8, wherein said user-network signaling receiver is an analog dual tone multiple frequency detector.

10. A bypass system as claimed in claim 8, further comprising a data address generator connected between said user-network signaling receiver and said router to convert said data call telephone number to a data network address.

11. A bypass system as claimed in claim 8, wherein said user-network signaling receiver processes analog input signals.

12. A bypass system as claimed in claim 1, further comprising a user-network signaling receiver, said user-network signaling receiver and said data call prefix detector connected to outputs of said voiceband call concentrator, said user-network signaling receiver for detecting tones of a data call identification prefix and a telephone number dialed on the subscriber line, and said data call prefix detector for detecting the pattern of said data call prefix.

13. A bypass system as claimed in claim 12, wherein said user-network signaling receiver processes digital input signals.

14. A bypass system as claimed in claim 12, further comprising a data address generator connected between said user-network signaling receiver and said router to convert said data call telephone number to a data network address.

15. A bypass system as claimed in claim 1, further comprising a modem bank having a plurality of modems connected between said data call concentrator and said router, said data call concentrator for selecting an available modem for transmission to said router of data that follow said data call telephone number.

16. A bypass system as claimed in claim 15, further comprising a plurality of analog receivers for processing analog user-network control signals connected to a shared data address generator, wherein each line that connects said data call concentrator to said plurality of modems is also connected to one of said plurality of analog receivers, and wherein said one of said plurality of analog receivers connects to said shared data address generator through a digital line.

17. A bypass system as claimed in claim 16, wherein each of said analog receivers processing analog user-network control signals is a dual tone multiple frequency (DTMF) receiver that converts tones of said data call telephone number to numbers, and wherein said data address generator translates the numbers into a data network address.

18. A bypass system as claimed in claim 1, further comprising a user-network signaling receiver connected to an output of said data call concentrator for converting tones of said data call telephone number to numbers.

19. A bypass system as claimed in claim 1, wherein said data call prefix detector is an alphanumeric character sequence detector.

20. A bypass system as claimed in claim 1, further comprising a data network connected to said router.

21. A bypass system as claimed in claim 1, wherein the connection between said data call concentrator and said line card passes through a wideband filter and an analog to digital converter of said line card.

22. A bypass system as claimed in claim 1, further comprising a voiceband filter and a first analog to digital converter connected between said line card and said voiceband call concentrator, and a wideband filter and a second analog to digital converter connected between said line card and said data call concentrator.

23. A bypass system as claimed in claim 1, wherein lines that connect said line card to said voiceband call and data call concentrators and lines that connect said voiceband call and data call concentrators to said voice switch and to said router are digital lines.

24. A bypass system as claimed in claim 1, wherein said subscriber line is an analog full-duplex signal line.

25. A bypass system as claimed in claim 1, wherein said router converts between network data communication formats and protocols used in said data network and subscriber data communication formats and protocols used in a subscriber data stream passed from said subscriber line to said data router.

26. A line card of a telephone network, comprising:
- a switch that switches to selectively connect a subscriber line to one of a telephone network voice switch and a router; and
- a data call prefix detector that controls switching of said switch in response to a data call prefix that precedes a data call telephone number on said subscriber line, said data call telephone number having a corresponding data networking address available from a network address conversion directory.

27. A line card as claimed in claim 26, further comprising a user-network control signaling receiver that converts tones of the data call prefix and telephone number to numbers.

28. A line card of a telephone network, comprising:
- a switch that switches to selectively connect a subscriber line to one of a voice switch and a router;
- a data call prefix detector that controls switching of said switch in response to a data call prefix that precedes a data call telephone number on said subscriber line; and
- a voice-band filter and a first analog to digital converter to filter and digitize signals directed to said voice switch.

29. A line card as claimed in claim 28, wherein said first analog to digital converter is connected to a voiceband call concentrator located between said line card and said voice switch.

30. A line card as claimed in claim 28, further comprising a wideband filter and a second analog to digital converter to filter and digitize signals directed to said router.

31. A line card as claimed in claim 30, wherein said second analog to digital converter is connected to said router through a data call concentrator.

32. A bypass system for modem data call bypass of a telephone network voice switch comprising:
- a line card connected to a subscriber line that selectively connects the subscriber line to one of said voice switch and a data switch;
- a data call prefix detector that controls the selective connection of the subscriber line in response to a data call prefix that precedes a data call telephone number dialed on the subscriber line;
- a voiceband call concentrator connected between said line card and said voice switch, said voiceband call concentrator being connected to the subscriber line in the absence of said data call prefix; and
- a data call concentrator connected between said line card and said data switch, said data call concentrator being connected to the subscriber line in the presence of said data call prefix.

* * * * *